United States Patent [19]
Duret et al.

[11] Patent Number: 4,707,672
[45] Date of Patent: Nov. 17, 1987

[54] END EQUIPMENTS FOR WIDEBAND TRANSMISSION LINE

[76] Inventors: Christian Duret, 6, rue de l'Epargne, 92320 Chatillon; Francis Pirio, 5, Square Grande, 75013 Paris, both of France

[21] Appl. No.: 882,381

[22] Filed: Jul. 7, 1986

[30] Foreign Application Priority Data

Jul. 8, 1985 [FR] France ................ 85 10420

[51] Int. Cl.⁴ .......................... H01P 5/00; H03H 7/52
[52] U.S. Cl. .................................... 333/4; 333/24 R; 333/124; 333/129; 333/132
[58] Field of Search ................. 333/4,5,101,24 R, 126, 333/129, 131, 132, 167, 177

[56] References Cited

PUBLICATIONS

R. R. Laane, The Bell System Technical Journal, HILO- An Improved Transmission Scheme for Semiconductor Switching Networks, Mar. 1971, pp. 1089–1093.

Steve Kelly, Electronics Designer's Handbook, Applications of the MC3416 Crosspoint Switch, pp. 1–11.
Electrical Designers' Handbook Appendixes 1–3, pp. 12–15.

Primary Examiner—Eugene R. Laroche
Assistant Examiner—Seung Ham
Attorney, Agent, or Firm—Laubscher & Laubscher

[57] ABSTRACT

Input and output equipment are provided for connecting first and second wideband signal transmission mediums through link equivalent to a balanced transmission line. The line can be made up of crosspoint cells includes in a wideband switching matrix, or can be a line distributed to intermediate equipments in a videocommuncation network. The input equipment includes means for separating high and low frequency signals included in the received wideband signals, means for transmitting the high frequency signals in differential mode, and means for transmitting the low frequency signals in High-Input Low-Output (HILO) mode. The output equipment includes means for taking the high and low frequency signals separately and means for summing the high and low frequency signals into wideband signals to be transmitted in the second medium.

10 Claims, 7 Drawing Figures

END EQUIPMENTS FOR WIDEBAND TRANSMISSION LINE

BACKGROUND OF THE INVENTION

1. Field of the Invention

This invention relates to wideband signal transmission used for example in main line security systems or in a television studio video control grid, or in a star structured videocommunication network.

2. Description of the Prior Art

In particular, in a videocommunication network, numerous switching network are necessary for the selection of programmes by a user and to assure videophone communications. Switching network are also necessary in the head end equipment of the videocommunication network. In order to provide services such as regional or national broadcasting of television programmes from wherever they are produced, or also, to bridge different videocommunication networks. The switching network environment now consists of optical fibers for user access, of carrier current or digital transmission systems with corresponding standard interfaces and base band video interfaces. Signals to be switched might be, depending on the case, base band video signals, modulated video signals, digitalized video signals having a bit rate of the order or 100 Mbit/s for distributing in a local network, standard digital multiplexed signals having a bit rate of between 2048 Kbit/s and 140 Mbit/s, for example.

Wideband signal transmission through transmission line having balanced conductor pairs has the advantage over coaxial cables of possible economies in the transmission medium, easy implementation thanks to insulator piercing mass connections, and strong protection to electromagnetic interference if balancing between the two conductors in each line is rigorously maintained.

The latter advantage is especially difficult to achieve over the whole spectrum of a base band video signal between approximately 6 Hz and 6 MHz. Conventional techniques based on the use of transformers alone or only on active circuits are no longer applicable. Effectively, easily set up circuits require transformers operating for audiofrequencies included in a low frequency range between 20 Hz and 20 KHz, . or, wideband transformers covering a limited number of decades, for examples between 100 KHz and 100 MHz, or, active circuits using integrated circuits of differential or operational amplifiers.

These active circuits are difficult to use outside a frequency range of a few hundred KHz if one wishes to achieve a rigorous balancing that can be achieved with transformers.

OBJECTS OF THE INVENTION

The main object of this invention is to provide input and output equipments connecting first and second wideband transmission medium via a transmission line having perfectly balanced conductors and enabling matching between the transmission mediums and the transmission line having different characteristic impedances, even though the signals to be switched cover a wide frequency band practically from direct current to several hundred MHz. The line can be made up of crosspoint cells included in a wideband switching matrix.

SUMMARY OF THE INVENTION

Accordingly, there is provided a combination of an input equipment and an output equipment, said input equipment connecting a first wideband transmission medium to two input terminals of a balanced conductor transmission line, and said output equipment connecting two output terminals of said line to a second wideband transmission medium, said input equipment being equivalent to a dipole having an input impedance equal to a characteristic impedance of said first and second mediums, and comprising means for separating low frequency signals and high frequency signals carried on said first medium, means for transmitting in differential mode said high frequency signals to said input terminals of said line and means for transmitting in HILO mode said low frequency signals to said input terminals of said line, said HILO mode consisting in injecting said low frequency signals into said line through said input equipment across a very high impedance and in collecting said low frequency signals transmitted by said line by said output equipment across a very low impedance, and said output equipment being equivalent to a dipole having a constant input impedance which, added to a characteristic impedance of said line, is equal to said characteristic impedance of said first and second mediums, and comprising means for taking the high frequency signals transmitted by said output terminals of said line, means for taking said low frequency signals transmitted by said output terminals of said line, and means for summing said taken high and low frequency signals into wideband signals to be transmitted in said second medium.

The transmission of wideband signals in the transmission line consists in dissociating at the line input the high frequency signals from the low frequency signals transmitted by the first medium. The low frequency signals are processed by active circuits using integrated circuit operational amplifiers, and the high frequency signals are processed by wideband transformers. The transmission of all the signals between output terminals of the input equipment and input terminals of the output equipment is done as in a balanced transmission line.

The low frequency signals are transmitted in the line in the so-called "HILO" mode. HILO mode is presented in R. R. LAANE article in THE BELL SYSTEM TECHNICAL JOURNAL, March 1971, pages 1089-1093, entitled "HILO—An Improved Transmission Scheme for Semi-conductor Switching Networks". HILO mode consists in injecting the low frequency signals entering into the line from a current generator, such as a voltage-to-current converter, having an output impedance as high as possible, and collecting them at the line output using a current-to-voltage converter having an input impedance as low as possible. HILO transmission mode enables a transmission quality as good as that obtained with differential mode transmission, but in frequency range limited by the quality of the active circuits included in the converters to some hundreds of kHz. The low frequency signals are transmitted in common mode but the generated voltages are extremely low because of the low input impedance of the output current-to-voltage converter.

The high frequency signals are transmitted in differential mode.

Moreover, the mutual interferences between the two transmission modes are extremely reduced.

BRIEF DESCRIPTION OF THE DRAWING

The foregoing and other objects, features and advantages of the invention will be apparent from the following detailed description of several preferred embodiments of the invention with reference to the corresponding accompanying drawings in which.

DESCRIPTION OF THE PREFERRED EMBODIMENTS

Figure 1:
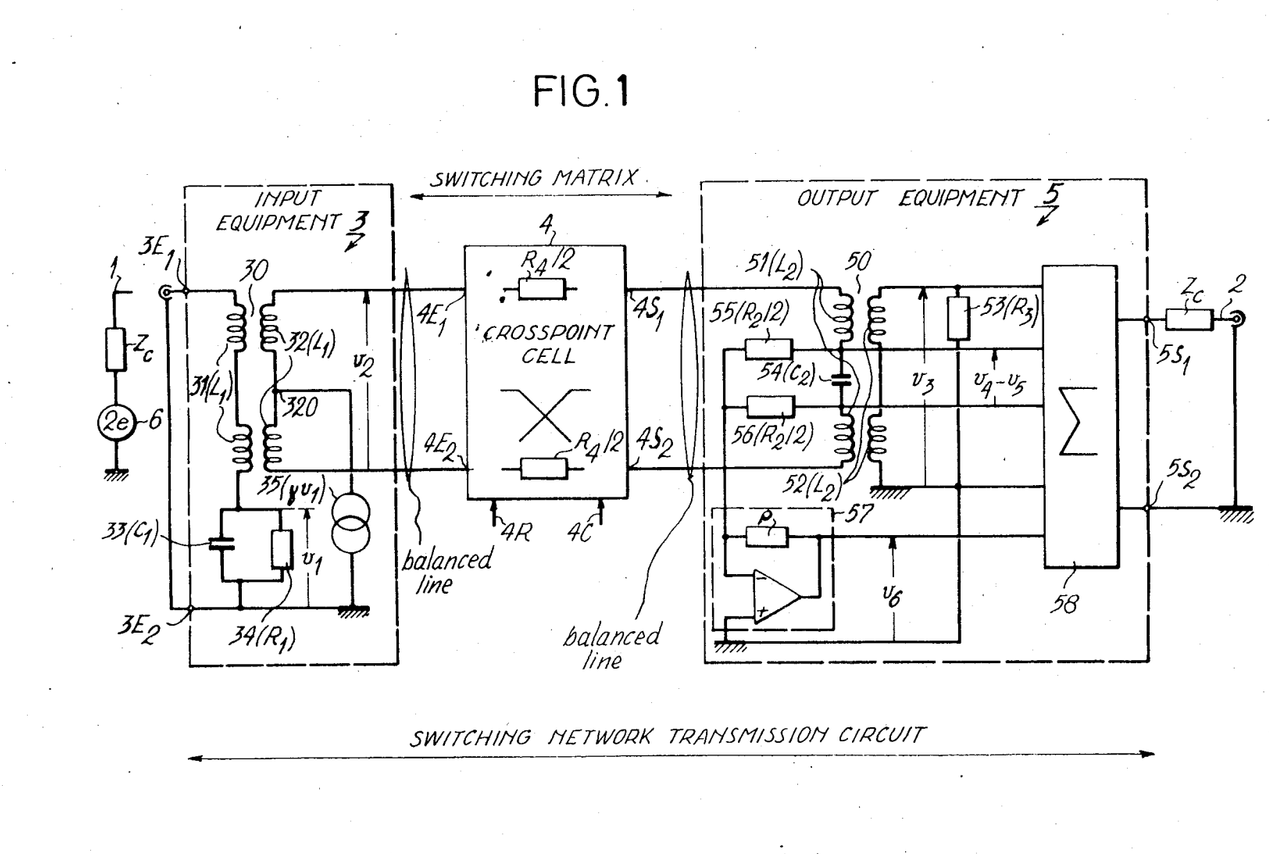
FIG. 1 shows schematically input and output equipments at either end of a transmission circuit included in a wideband switching network.

FIG. 1 shows a transmission circuit of switching network between one, 1, of several input transmission mediums serving the switching network and one, 2, of several output transmission mediums served by the switching network. The input and output mediums form respectively M rows and N columns of a matrix of M×N known crosspoint cells in the network where M and N are integers. The transmission mediums are wideband lines capable of carrying low frequency signals having frequencies between 0 Hz and a few tens kHz, as well as high frequency signals having frequencies between 100 kHz and some hundreds of Mhz. The signals can be analog or digital signals, modulated or in base band. The transmission mediums 1 and 2, as shown in the figures, are unbalanced coaxial lines, to which we turn later, or for example, line with balanced paires of conductor wires or optical fibers, provided appropriate matching interfaces are arranged at switching network inputs and outputs. Lines 1 and 2 have a characteristic impedance $Z_c$ of 75 ohms, for example.

Each transmission circuit of the switching network, such as the one shown in FIG. 1, includes an input equipment 3, so-called input junctor 3, a crosspoint cell 4, and an output equipment 5, so-called output junctor. Each of the M input equipments is connected to inputs of N crosspoint cells in the switching matrix so that the respective input line 1 can be connected selectively to one of the N output lines. Moreover, outputs from M crosspoint cells in the switching matrix are connected to an output equipment so that the respective output line 2 selectively transmits inputting signals via any one of the M conducting crosspoint cells.

According to another embodiment, the switching matrix includes several switching stages and each transmission circuit includes as many crosspoint cells, as there are switching stages; in this case, the crosspoint cell 4 shown in FIG. 1 is replaced by crosspoint cells connected in series.

A crosspoint cell 4 is known in the prior art and enables, in the conducting state, a connection of a respective input line 1 through the associated equipment 3 to a respective output line 2 through the associated equipment 5. Connection between line 1 and line 2 is established under the control of two signals addressing the row and the column of the matrix crossing at crosspoint cell 4, said signals being supplied by an address memory in the network and applied to corresponding control terminals 4R and 4C of the crosspoint cell 4. Crosspoint cell 4 is, for example, a solid-state bipolar device comprising two thyristors simultaneously controllable across a two-collector bipolar transistor, as described in STEVE KELLEY article entitled "APPLICATION OF THE MC3416 CROSSPOINT SWITCH", MOTOROLA INC, Application Note AN-760, 1976. This type of connection point enables switching of base band video signals as well as of digital streams that can attain a high bit rate, up to 140 Mbit/s for example. Moreover, a switching matrix with such crosspoint cells consumes energy proportional to the number of established paths between inputs and outputs at a given time, and therefore to the traffic flow through the switching network. A test of continuity of the established paths is facilitated by the thyristor holding current. For this invention, it will be observed that the crosspoint cell in conducting state is equivalent to a quadripole having two input terminals $4E_1$ and $4E_2$ and two output terminals $4S_1$ and $4S_2$ and having a predetermined resistance $R_4$, i.e., a resistance $R_4/2$ between an input terminal $4E_1$, $4E_2$ and an output terminal $4S_1$, $4S_2$ ; the resistance $R_4/2$ denotes the resistance of one of the thyristors in conducting state to be interconnected between a conductor of the associated input line and a conductor of the associated output line. The quadripole between the input terminals $4E_1$ and $4E_2$ and the output terminals $4S_1$ and $4S_2$ has characteristics of a transmission line with a balanced conductor pair having a characteristic impedance equal to $R_4$.

In the input equipment 3, low and high frequency voltage signals 2e supplied by a voltage source 6 through line 1 are separated by means of a dipole having a constant resistance so that the low frequency signals and high frequency signals be transmitted in so-called "HILO" (High Input Low Output) mode and in differential mode respectively in the switching matrix. The dipole includes, between the input terminals $3E_1$ and $3E_2$ of the input equipment 3 connected to two conductors of line 1, a primary winding 31 of a first wideband transformer 30 having a secondary winding 32 loaded by an input impedance $Z_e$ of conducting state crosspoint cell, such as cell 4, between the terminals $4E_1$ and $4E_2$, and a parallel combination of a capacitor 33 and a resistor 34 connected in series with the primary winding 31. The input equipment 3 also includes a current source 35 interconnected between the grounded input terminal $3E_2$, and a middle point 320 of the second winding 32.

Figure 2:
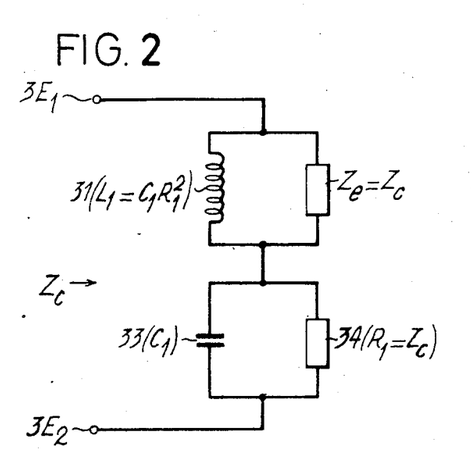
FIG. 2 shows a circuit equivalent to the input equipment.

The dipole in equipment 3 is equivalent to a circuit shown in FIG. 2, in which the input impedance $Z_e$ of crosspoint cell 4 is carried back between the terminals of the primary winding 31, given that the current source 35, equivalent to a voltage-to-current converter, has input and output impedances as high as possible. So that the dipole should have a constant resistance, it is known that, according to L. J. GIACOLETTO book, "Electronics Designer's Handbook", Second Edition, 1977, McGraw-Hill Book Company, page 5–9, that the following conditions must be satisfied;

$Z_e = R_1$ and $$L_1 = C_1 \cdot R_1^2$$

where $R_1$ denotes the resistance of resistor 34, which is equal to the constant input resistance of the dipole, $L_1$ denotes the inductance of one of the windings 31 and 32, and $C_1$ denotes the capacitance of capacitor 33.

To obtain matching of line 1 it is necessary that it should be looped on its characteristic impedance for the whole range of signal frequencies to be transmitted, and therefore that the forementioned dipole should provide a constant resistance such that:

$$Z_e = R_1 = Z_c$$

The transformer 30 is thus loaded by the characteristic impedance $Z_e$ so as to assure matching continuity across the switching network between the input and output lines 1 and 2.

The HILO mode low frequency signals are taken by the capacitor and resistor circuit 33-34 and are injected into the crosspoint cell matrix by the current source 35 having a transconductance $\gamma$. Voltage $v_1$ between the circuit 33-34 terminals is given by the following equation:

$$v_1 = 2e(R_1/(1+jR_1C_1\omega))/(Z_c+(jZ_eL_1\omega)/(Z_e+jL_1\omega)+R_1/(1+jR_1C_1\omega))$$

which, taking into account the three preceding relationships, can be written:

$$v_1 = e/(1+jf/f_{c1})$$

where $f = \omega/(2\pi)$ denotes the signal frequencies, and $f_{c1}$ denotes a cut-off frequency such that:

$$f_{c1} = 1/(2\pi R_1 C_1) = R_1/(2\pi L_1)$$

The high frequency signals are transmitted in differential mode to the crosspoint cell matrix by the transformer 30. Voltage $v_2$ between the terminals of transformer 30 is given by the following equation:

$$v_2 = 2e \cdot (jZ_eL_1\omega/(Z_e+jL_1\omega))/(Z_c+(jZ_eL_1\omega)/(Z_e+jL_1\omega)+R_1/(1+jR_1C_1\omega))$$

which, taking into account the three preceding relationships, can be written:

$$v_2 = e \cdot (jf/f_{c1})/(1+jf/f_{c1})$$

The cut-off frequency $f_{c1}$ between the two transmission modes enables efficient dissociation between the two transmission modes and, thus extreme reduction of mutual interferences between the two modes. The balancing properties of the wideband transformer 30, as well as the very low common mode voltage due to the HILO mode mean that decoupling between the two transmission modes is excellent.

As shown in FIG. 1, the output equipment 5 includes a constant-resistance dipole for separating the low frequency signals and high frequency signals transmitted by the output $4S_1$-$4S_2$ of crosspoint cells 4 in conducting state. The second dipole includes, between the output terminals $4S_1$ and $4S_2$ of cell 4, a second transformer 50 having a primary winding 51 interconnected between terminals $4S_1$ and $4S_2$ and a secondary winding 52 loaded with a resistor 53 having an grounded terminal, a capacitor 54 interconnected between two half-windings of the primary winding 51, and a series combination of two resistors 55 and 56 having resistances equal to $R_2$, said combination being connected in parallel with capacitor 54. The output equipment 5 also includes a current-to-voltage converter 57 having an amplification factor $p$ for low frequency signals and having an input connected to a terminal common to the resistors 55 and 56, and a voltage summing circuit 58 having output terminals constituting those $5S_1$ and $5S_2$ of equipment 5 connected to the output transmission line 2.

Figure 3:
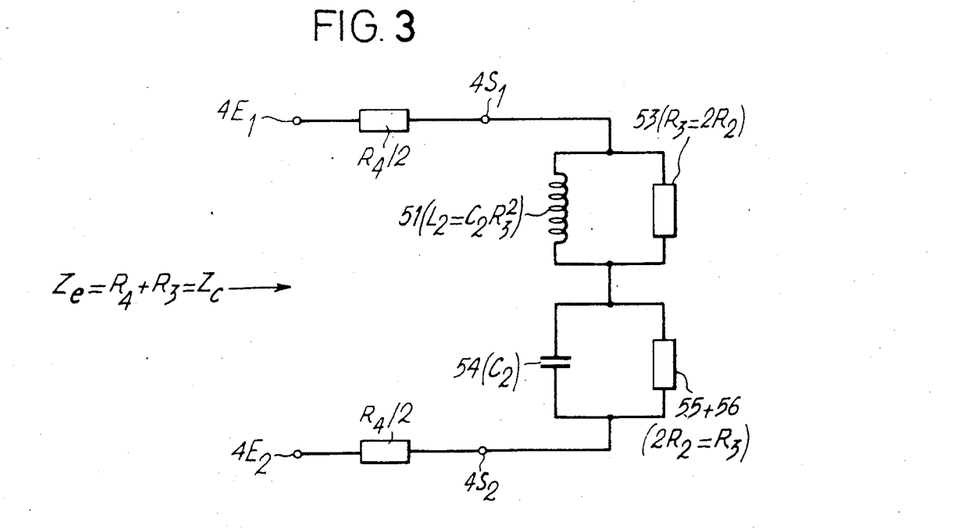
FIG. 3 shows a circuit equivalent to the output equipment and to a crosspoint cell in the transmission circuit.

The dipole in equipment 5 is equivalent to a circuit shown in FIG. 3, analogous to that shown in FIG. 2, in which the resistor 53 is carried back to terminals $4S_1$ and $4S_2$ of the primary winding 51, given that the value $R_3$ of the resistor 53 is small in relation to the high input impedance of the summing circuit 58, and that the current-to-voltage converter 57 has input and output impedances practically equal to zero. So that the second dipole should have a constant resistance, the following condictions must be satisfied:

$$R_3 = 2R_2$$

and $$L_2 = C_2 \cdot R_3^3$$

where $L_2$ and $C_2$ denote the inductance of one of windings 51 and 52 and the capacitance of capacitor 54 respectively, and $2R_2$ denotes the constant input resistance of the second dipole.

Furthermore, so that the input impedance $Z_e$ at the input terminals $4E_1$ and $4E_2$ of crosspoint cell 4 should be equal to the characteristic impedance $Z_c$, the following relationship must be satisfied:

$$Z_e = Z_c = R_4 + R_3$$

where $R_4$ denotes, as already stated, the resistance of crosspoint cell 4 in conducting state.

The summing circuit 58 sums up three voltage signals, i.e. a first high frequency signal $V_3$ taken between the terminals of the secondary winding 52 and the resistor 53 and having crossed the two transformers 30 and 50, a second high frequency signal in differential mode $(v_4-v_5)$ which has not been able to cross the output transformer 50 and is taken between the terminals of capacitor 54, and a third HILO mode low frequency signal $v_6$ restored at the output of the current-to-voltage converter 57, so that outputs $5S_1$ and $5S_2$ transmit the complete signal coming from input line 1 to the output line 2.

The first signal $v_3$ is given by the following equation:

$$v_3 = v_2(jR_3L_2\omega/(R_3+jL_2\omega))/(R_4+(jR_3L_2\omega)/(R_3+jL_2\omega)+(2R_2)/(1+2jR_2C_2\omega))$$

which, taking into account three of the preceding relationships, can be written:c $$v_3 = v_2 \cdot (R_3/(R_4+R_3)) \cdot ((jf/f_{c2})/(1+jf/f_{c2}))$$

or, by replacing $v_2$ by the second term of the equation:

$$v_3 = e \cdot (R_3/(R_4+R_3)) \cdot ((jf/f_{c1})/(1+jf/f_{c1})) \cdot ((jf/f_{c2})/(1+jf/f_{c2}))$$

where $f_{c2}$ denotes a cut-off frequency such that:

$$f_{c2} = 1/(2\pi R_3 C_2) = R_3/(2\pi L_2)$$

The second signal ($v_4 - v_5$) is given by the following equation:

$$(v_4 - v_5) = v_2 \cdot (2R_2/(1 + 2jR_2C_2\omega))/(R_4 + (jR_3L_2\omega)/(-R_3 + jL_2\omega) + (2R_2)/(1 + 2jR_2C_2\omega))$$

which, taking into account the three preceding relationships, can be written:

$$(v_4 - v_5) = v_2 \cdot (R_3/(R_4 + R_3)) \cdot (1/(1 + jf/f_{c2}))$$

or, replacing $v_2$:

$$(v_4 - v_5) = e \cdot (R_3/(R_4 + R_3)) \cdot ((jf/f_{c1})/(1 + jf/f_{c1})) \cdot (1/(1 + jf/f_{c2}))$$

The third signal $v_6$ is given by the following equation:

$$v_6 = \rho(\gamma v_1)$$

or, by replacing $v_1$ by the relevant equation:

$$v_6 = e \cdot \gamma \rho/(1 + jf/f_{c1})$$

Figure 4:
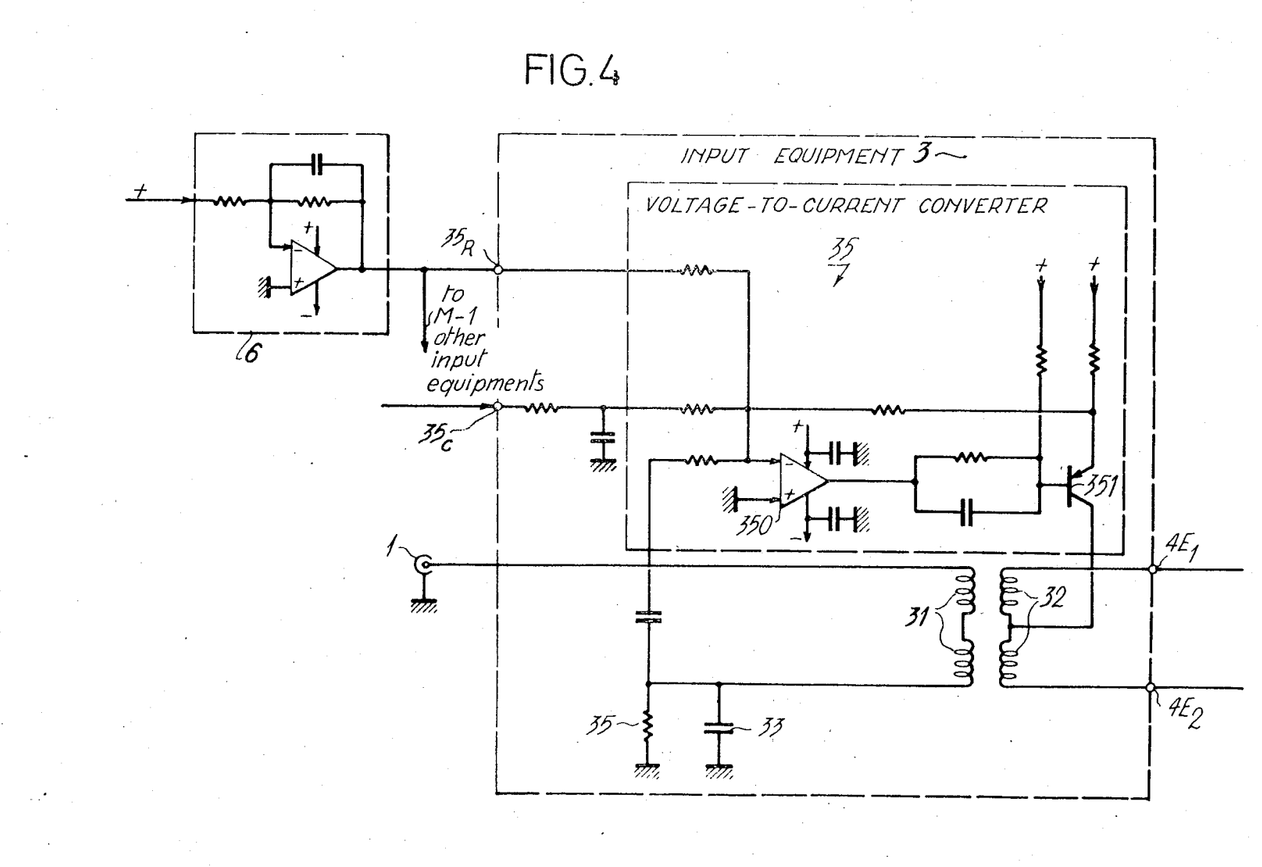
FIG. 4 shows a preferred embodiment of the input equipment.

FIG. 4 shows a preferred embodiment of the input equipment 3 in which the voltage-to-current converter 35 includes, an operational amplifier 350 and a bipolar power-ballast transistor 351. Input terminals $35_R$ and $35_C$ of equipment 3 are provided to apply a reference voltage from a voltage source 6 common to all the input equipments of the switching network, and to control switching on and off of the connection through crosspoint cell 4 by release and cutting-off of current, respectively.

Figure 5:
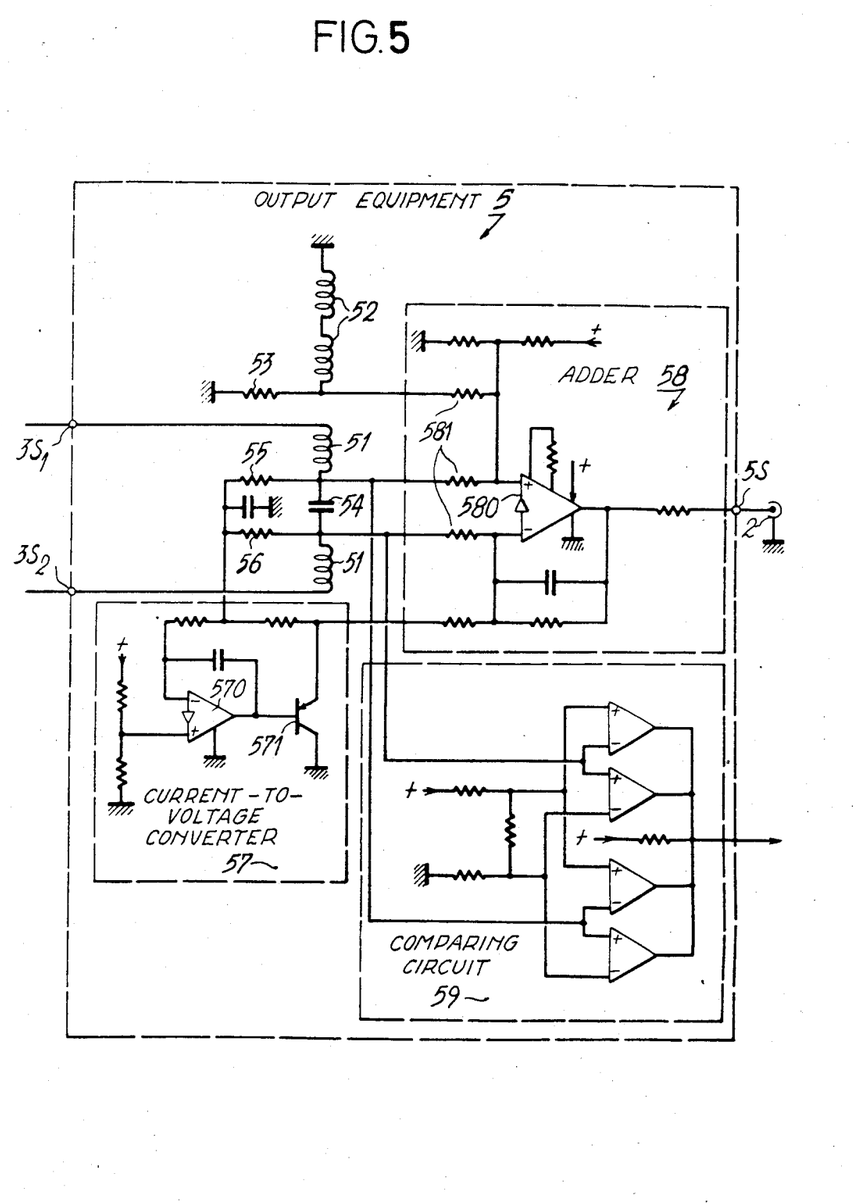
FIG. 5 shows a preferred embodiment of the output equipment.

FIG. 5 shows a preferred embodiment of the output equipment 5 in which the current-to-voltage converter 57 includes an operational amplifier 570 and a bipolar power-ballast transistor 571, and the summing circuit 58 includes an operational amplifier 580 having suitable input resistors 581 and working as an adder and a subtracter. The equipment 5 can equally include a comparision circuit 59 having two pairs of voltage comparators respectively connected to the terminals of capacitor 54 to check that each output line conductor transmits half of the holding current passing through a crosspoint cell connected to equipment 5.

Figure 6:
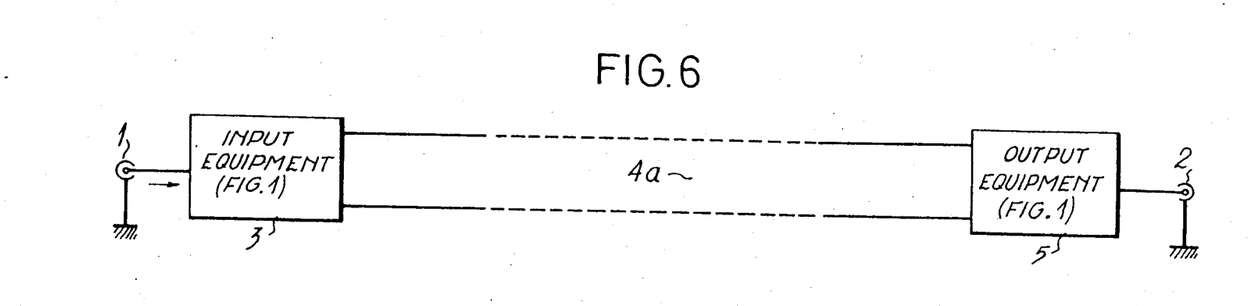
FIG. 6 show a second application of input and output equipments in conjunction with a balanced line.

According to a second application shown in FIG. 6, the input equipment 3 and output equipment 5 are directly connected by a transmission line 4a having balanced pairs of conductors. Such a transmission in differential and HILO mode, without switching, can be used, for example, in a distribution frame arranged at the input of a telephone automatic central office.

Figure 7:
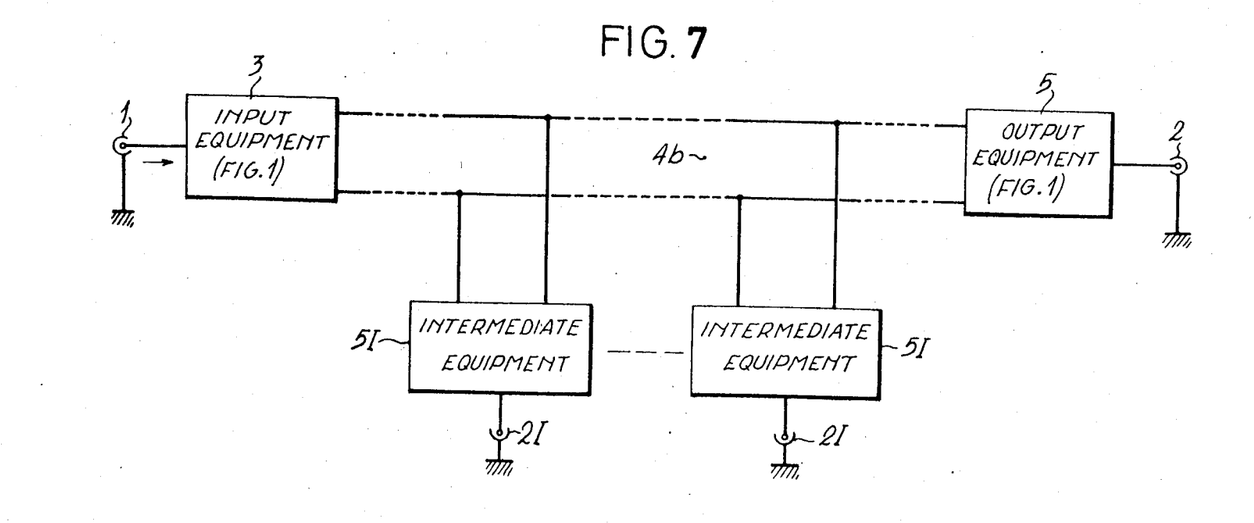
FIG. 7 shows a third application of input and output equipments in conjunction with a transmission line distributed to intermediate output equipments.

According to third application shown in FIG. 7, an input equipment 3 is connected to an output equipment 5 through a transmission line 4b having balanced pairs of conductors; however, between equipment 3 and 5, the line 4b is provided with several intermediate equipment 51 taking wideband signal from line 4b to be transmitted in coaxial lines 21. For example, the signal transmitted by coaxial line 1 is a television channel which has been selected in a distribution station among several television channels transmitted on distributing link included in a cable television distribution network and which is to be transmitted to several subscriber video terminals served respectively by lines 21. Each of the intermediate equipments 51 is analogous to the output equipment 5, but does not include a current-to-voltage converter in order to eliminate low frequency signals, and has a summing circuit with different weighting to that of summing circuit 58, i.e., input resistors having different resistances to those in summing circuit 58 (FIG. 5) in equipment 5.

It should be noted that the object of the present invention, defined by the annexed claims, covers separately, an input equipment, an output equipment, and an intermediate equipment.

What we claim is:

1. A combination of an input equipment and an output equipment
    said input equipment connecting a first wideband transmission medium to two input terminals of a balanced conductor transmission line, and said output equipment connecting two output terminals of said line to a second wideband transmission medium,
    said input equipment being equivalent to a dipole having an input impedance equal to a characteristic impedance of said first and second mediums, and comprising means for separating low frequency signals and high frequency signals carried on said first medium, means for transmitting in differential mode said high frequency signals to said input terminals of said line and means for transmitting in HILO mode said low frequency signals to said input terminals of said line,
    said HILO mode consisting in injecting said low frequency signals into said line through said input equipment across a very high impedance and in collecting said low frequency signals transmitted by said line by said output equipment across a very low impedance, and
    said output equipment being equivalent to a dipole having a constant input impedance which, added to a characteristic impedance of said line, is equal to said characteristic impedance of said first and second mediums, and comprising means for taking the high frequency signals transmitted by said output terminals of said line, means for taking said low frequency signals transmitted by said output terminals of said line, and means for summing said taken high and low frequency signals into wideband signals to be transmitted in said second medium.

2. The combination claimed in claim 1, wherein
    said separating means comprises a primary winding of a transformer and a parallel combination of a resistor and a capacitor, and said primary winding and said resistor and capacitor combination being connected in series to said first transmission medium,
    said differential mode transmitting means comprises a secondary winding of said transformer connected to said input terminals of said transmission line, and
    said HILO mode transmitting means comprises a voltage-to-current converter interconnected between a parallel combination terminal and a middle terminal of said secondary winding.

3. The combination claimed in claim 1, wherein
    said high frequency signal taking means comprises a transformer having a primary winding connected between said output terminals of said transmission line, and a secondary winding connected to said summing means, and said low frequency signal taking means comprising a capacitor connected in parallel with two resistors and interconnected between two half-windings of said primary winding, said two resistors being equal, and a current-to-voltage converter having an input terminal connected to a terminal common to said two resistors, and an output terminal connected to said summing means.

4. The combination claimed in claim 3, wherein said summing means sums a first voltage between terminals of said secondary winding, a second voltage between terminals of said capacitor, and a third voltage delivered from said output terminal of said current-to-voltage converter.

5. The combination claimed in claim 1, wherein said transmission line is made up of crosspoint cells included in a wideband switching matrix for selectively connecting said input equipment to said output equipment.

6. The combination claimed in claim 1, wherein said transmission line is a transmission line distributed to several intermediate output equipments analogous to said output equipment.

7. An equipment for connecting a wideband transmission medium to two input terminals of a balanced transmission line, said transmission medium carrying both low and high frequency signals, said equipment comprising a transformer having a primary winding and a secondary winding, a parallel combination of a resistor and a capacitor, and a voltage-to-current converter, said primary winding and said parallel combination being connected in series to said transmission medium thereby separating said high frequency signals and said low frequency signals, said secondary winding being connected to said input terminals of said transmission line thereby transmitting said separated high frequency signals in a differential mode on said transmission line, and said voltage-to-current converter being interconnected between a terminal of said parallel combination and a middle terminal of said secondary winding thereby transmitting said separated low frequency signals in a High Input-Low Output mode on said transmission line.

8. The equipment claimed in claim 7, wherein said transmission line is made up of crosspoint cells included in a wideband switching matrix.

9. An equipment for connecting two output terminals of a balanced transission line to a wideband transmission medium, said transmission line carrying low frequency signals in High Input-Low Output mode and high frequency signals in differential mode, said equipment comprising a transformer having two primary half-windings and a secondary winding, two resistors having equal resistance, a capacitor, a current-to-voltage converter, and summing circuit connected to said transmission medium, said half-windings having first terminals connected to said output terminals of said transmission line, said capacitor being connected to second terminals of said half-windings and to said summing circuit, and said secondary winding being connected to said summing circuit, thereby applying at least said high frequency signals to said summing circuit, and said resistors having first terminals connected to said second terminals of said half-windings respectively and second terminals connected to an input terminal of said current-to-voltage converter, and said current-to-voltage converter having an output terminal connected to said summing circuit thereby applying said low frequency signals to said summing circuit, said summing circuit summing the applied low and high frequency signals into wideband signals to be carried in said transmission medium.

10. The equipment claimed in claim 9, wherein said transmission line is made up of crosspoint cells included in a wideband switching matrix.

* * * * *